Dec. 9, 1941.　　　　J. A. RAU　　　　2,265,395
SUPPORT FOR BULLDOZERS
Filed Oct. 9, 1940　　　3 Sheets-Sheet 3
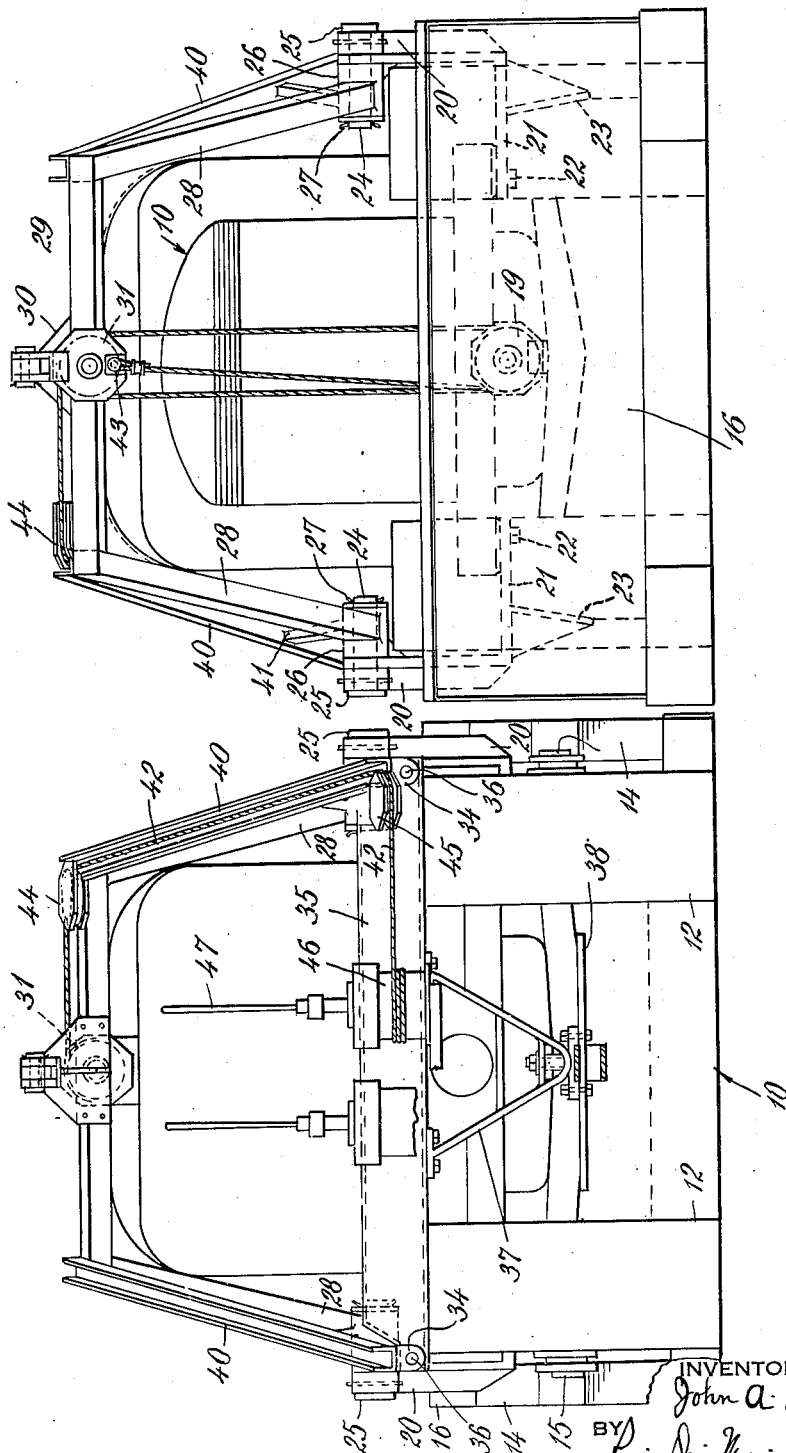
INVENTOR
John A. Rau
BY
Pennie Davis Marvin & Edmonds
ATTORNEY Patented Dec. 9, 1941

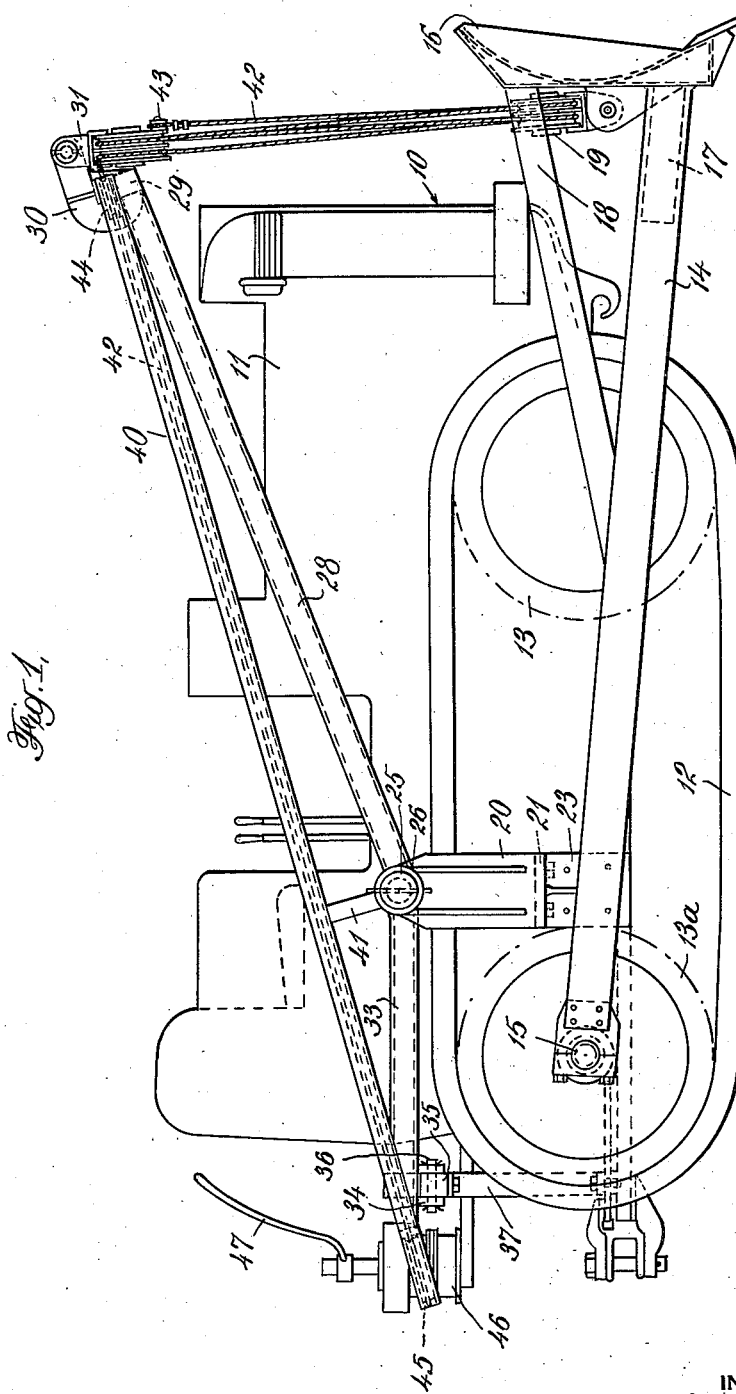

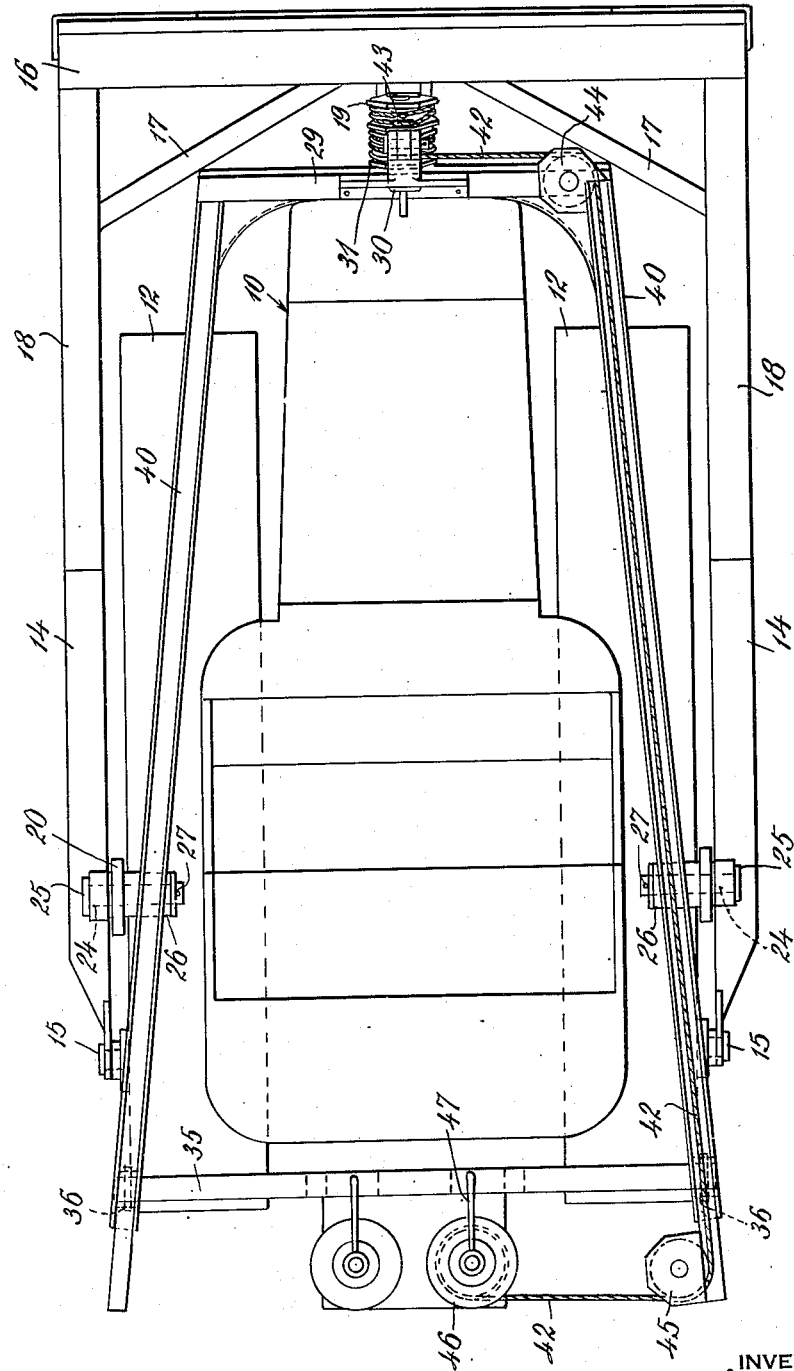

2,265,395

UNITED STATES PATENT OFFICE 2,265,395

SUPPORT FOR BULLDOZERS

John August Rau, Phoenix, Ariz., assignor to Allison Steel Manufacturing Company, Phoenix, Ariz., a corporation of Arizona Application October 9, 1940, Serial No. 360,426

5 Claims. (Cl. 37—144)

This invention relates to supporting structures for mold boards, plows, brushes, and the like, and more particularly to a novel structure for supporting an implement of this type on a vehicle, such as a tractor, which propels the implement. The new support is of simple construction, is adjustable to vary the height of the implement, and may be readily moved to an inoperative position to facilitate servicing of the vehicle.

In supporting working implements, such as mold boards on tractors, and the like, it is a common practice to provide one or more supporting beams on the tractor which project over the front of the vehicle, the implement being supported by a cable or rope extending over a pulley mounted on the beams above the implement. The free end of the cable or rope is usually connected to a winch so that by operating the latter the height of the implement may be adjusted. Supporting structures of this form are objectionable for the reason that the beams projecting over the front of the vehicle interfere with the servicing of the engine, since they are disposed adjacent the engine housing and prevent ready access to the engine. Accordingly, it is generally necessary to remove part or all of the supporting structure from the vehicle before the engine is serviced, and to replace the parts after the servicing is completed.

One feature of the present invention, therefore, resides in the provision of a novel structure for supporting a mold board or other implement on a vehicle, which may be quickly and easily moved from an operative position to an inoperative one to permit ready access to the engine. A supporting structure made in accordance with my invention comprises a connection between the vehicle and the implement on which the latter is adapted to move up and down in front of the vehicle, and a support pivotally mounted intermediate its ends on the vehicle for movement about a horizontal transverse axis and projecting over the front of the vehicle. Preferably, the support includes two beams pivotally mounted on opposite sides of the vehicle and connected at their front ends to a crosspiece overlying the implement, and a pulley is secured to the cross-piece and has a cable passing over it from the implement to a winch or other means for drawing in and letting out the cable to adjust the height of the implement. At its rear end, the support is held down by releasable means secured to the vehicle to maintain the front end of the support in its operative position.

With this construction, when the vehicle is to be serviced, the means connecting the rear end of the support to the vehicle is released and the support is tilted so that its front end moves downwardly to an inoperative position in which it permits servicing of the engine more readily. After the servicing is completed, the support is tilted back to its operative position and secured again at its rear end by the releasable means.

Another feature of the invention resides in the provision of a novel supporting structure for tractor implements, and the like, which is of a simple construction easily installed on the vehicle and is strong and durable. In the preferred construction, the implement is mounted on a pair of arms extending lengthwise of the vehicle on opposite sides and pivoted at their rear ends to part of the vehicle, as, for example, to the rear axle. Secured to each side of the vehicle is a bracket on which a supporting beam is mounted, each beam having a horizontal part extending rearwardly and an inclined part extending forwardly and upwardly to the crosspiece supporting the pulley. The cable from the implement extends over the pulley and along a trough shaped member to the usual winch, the trough member preferably being secured at its ends to the ends of one of the supporting beams and having a brace between its intermediate portion and the beam near the pivotal mounting for the latter. Thus, the trough member not only houses the cable but forms with the adjacent supporting beam and the intermediate brace a truss-like structure adapted to support an implement of considerable weight in front of the vehicle.

These and other features of the invention may be better understood by reference to the following detailed description taken in conjunction with the accompanying drawings. In the drawings—

Fig. 1 is a side view showing one form of the new supporting structure mounted on a vehicle;

Fig. 2 is a plan view of the structure shown in Fig. 1; and

Figs. 3 and 4 are rear and front views, respectively, of the structure shown in Figs. 1 and 2.

For illustrative purposes, I have shown the supporting structure applied to a tractor 10, although it will be understood that the structure may be applied to trucks or other vehicles as well. The tractor, as shown, comprises the usual body 11 which houses the engine (not shown), and a tractor belt 12 on each side of the body disposed around front and rear wheels 13 and 13a, respectively.

Extending along each side of the tractor is a supporting arm 14 which at its rear end is pivotally connected to any suitable part of the tractor, as, for example, to the axle of the rear wheels 13a, through pins 15. At their front ends the arms 14 are connected to a working implement, such as a mold board 16, disposed directly in front of the tractor engine. Preferably, the connection between the arms 14 and the mold board is strengthened by means of braces 17 and 18. A pulley block 19 is connected to a suitable bracket on the rear face of the mold board, for a purpose to be described presently.

The tractor is provided on each side with a standard 20 extending upwardly a substantial distance from the adjacent arm 14, the standards being formed with horizontal legs 21 secured to the under part of the tractor, as by means of bolts 22. Each standard may be braced by an arm 23 projecting downwardly from the leg 21 and suitably secured to a part (not shown) within the tractor belt 12. Mounted on the upper end of each standard 20 is a pin 24 having a head 25 disposed opposite the outer face of the standard, the shank of the pin projecting inwardly. A hub 26 is rotatably mounted on each of the pins 24 and is held in position against the inner face of the standard by a cotter pin 27. Each of the hubs 26 forms part of a supporting beam which comprises an inclined member 28 extending forwardly and upwardly from the hub, the members 28 preferably converging toward their front ends. A cross-piece 29 is suitably connected to the front ends of the members 28 above the mold board and carries a bracket 30 on which a pulley block 31 is pivotally mounted.

Projecting rearwardly from the hubs 26 are generally horizontal members 33 which, as shown, diverge from the hubs so as to form continuations of the inclined members 28. Thus, the inclined members 28, the horizontal members 33 and the hubs 26 form in effect a pair of supporting beams pivotally mounted intermediate their ends on opposite sides of the structure. The rear end of each beam is provided with a yoke 34, the jaws of which extend downwardly on opposite sides of a cross member 35, and the yokes are secured to the end portions of the cross member by means of pins 36 extending through the yokes and the cross member. It will be apparent that by removing the pins 36 the yokes, and therefore the supporting beams 28—33, may be disconnected from the cross member 35. Below the cross member is a generally V-shaped bracket 36 having its arms connected at their upper ends to the cross member, the lower portion of the bracket being connected in any suitable manner to the usual tow-plate 38 at the rear end of the tractor.

A generally trough-shaped member 40 is mounted on each of the supporting beams 28—33 on opposite sides of the tractor, the members 40 being preferably secured in any suitable manner to the ends of the respective supporting beams. Intermediate its ends, each of the trough-shaped members 40 is braced by a spoke 41 extending upwardly from the adjacent hub 26, whereby the beams 28—33, the trough members 40 and the spokes 41 form in effect a pair of trusses pivotally mounted on the standards 20.

The mold board 16 is adapted to be supported at any desired height on its arms 14 by means of a flexible cable 42 secured at one end to a lug 43 on the pulley block 31. From the lug 43, the cable extends downwardly around one of the pulleys in the block 19, upwardly around one of the pulleys in the block 31, downwardly again around the other pulley of block 19, and then upwardly around the other pulley of block 31, from which the cable extends along the cross-piece 29 and over a pulley block 44 secured to one end of the cross-piece. From the pulley 44, the cable 42 extends along the adjacent trough member 40 to the rear end thereof and then over a pulley 45 which may be secured in any suitable manner to the trough member 40 which houses the cable. The cable extends from the pulley 45 to a winch 46 comprising a drum around which the cable is wound and a handle 47 for rotating the drum to wind up or let out the cable.

When the implement 16 is to be used, the drum of the winch 46 is rotated by the handle 47 to adjust the implement to the proper height above the ground. The winch may be provided with a suitable catch (not shown) for locking it in the adjusted position. When it is desired to drive the tractor without using the implement, the drum of the winch is rotated to wind up a considerable length of the cable 42 and thereby raise the implement to an elevated position in which it is inoperative. It will be apparent that in servicing the tractor engine under the body 11, the inclined members 28 of the supporting beams in their normal positions would interfere with the operations of the mechanic and prevent ready access to the engine. With my new construction, however, the supporting means for the implement may be moved to an inoperative position in which the normally inclined members 28 are located considerably below the top of the engine where they do not interfere with the mechanic servicing the engine. That is, upon removing the pins 36 through which the rear ends of the supporting beams are connected to and held down by the tow-plate 38, the beams tilt about their pivotal mountings 24 so that their front portions 28 move downwardly until they engage the tractor belts 12. Due to the fact that the pivot pins 26 are located to the rear of the centers of gravity of the trusses made up of the supporting beams, the trough members 40 and the spokes 41, the trusses will automatically move to their inoperative positions when the pins 36 are withdrawn. As the trusses tilt toward their inoperative positions, the pulley block 45 moves upwardly and away from the drum of the winch 46 so that the cable 42 is drawn through the trough member 40 and takes up the slack which would otherwise result between the pulley block 31 and the implement. When the servicing of the engine is completed, the supporting structure may be moved back to its operative position by elevating the front ends of the trusses until the yokes 36 re-engage the cross member 35, whereupon the pins 36 are inserted through the yokes and the cross member.

It will be observed that with the new construction the trough members 40 not only house the part of the cable between the pulley blocks 31 and 45, but also form with the supporting beams 28—33 and the spokes 41 trusses which are adapted to support a considerable weight at their upper ends. By reason of these trusses, the supporting structure is better able to withstand the stresses and shocks to which it is normally subjected in the use of the implement 16. Since the new supporting structure is connected to the tractor only by the pins 15, the standards 20 and the bracket 37, the structure may be quickly and easily installed or removed. While I have provided pins 36 which may be withdrawn to release the supporting trusses, it will be understood that the latter may be released by simply disconnecting the bracket 37 from the tow-plate 38.

I claim:

1. In a vehicle, a supporting beam pivotally mounted intermediate its ends on the vehicle for movement about a generally horizontal axis and having a part extending from its axis forwardly and upwardly adjacent the vehicle engine, the beam having another part extending rearwardly from its axis, a working implement in front of the vehicle, a flexible element connected to the implement and supported by the forwardly extending part of the beam, means near the opposite end of the beam connected to said element for varying the length of the same between the implement and the adjacent end of the beam and thereby adjusting the height of the implement, a housing member connected to the ends of the beam for receiving part of the flexible element, bracing means extending between the housing member and the intermediate part of the beam adjacent the pivotal mounting thereof, said beam, member and bracing means forming a truss, and releasable means connecting the rearwardly extending part of the beam to the vehicle for holding said first part in an operative position relative to the implement and adjacent the upper portion of the engine, said last means being releasable to permit tilting of the beam about its axis to an inoperative position to move said first part of the beam below the upper portion of the engine and permit access to the engine.

2. In a vehicle, a supporting beam pivotally mounted intermediate its ends on each side of the vehicle for movement about generally horizontal axes, a working implement in front of the vehicle, connecting means between the implement and the adjacent ends of the beams for supporting the implement, said means being adjustable to vary the position of the implement, a cross-member between the rear ends of the beams and connected to the vehicle, and releasable means connecting the rear ends of the beams to the cross-member to hold the front ends of the beams in operative positions, said last means being releasable to permit tilting of the beams about their axes to inoperative positions.

3. In a vehicle, a supporting beam pivotally mounted intermediate its ends on each side of the vehicle for movement about generally horizontal axes, a working implement in front of the vehicle, connecting means between the implement and the adjacent ends of the beams for supporting the implement, said means being adjustable to vary the position of the implement, a cross-member between the rear ends of the beams and connected to the vehicle, yokes on the rear ends of the beams, and pins extending through the yokes and the opposite end portions of the cross-member for holding the front ends of the beams in operative positions, the pins being removable to permit tilting of the beams about their axes to inoperative positions.

4. In a vehicle having an engine, a supporting beam pivotally mounted intermediate its ends on each side of the vehicle for movement about a generally horizontal axis, a working implement in front of the vehicle, adjustable means for supporting the implement on the beams, a cross arm at the rear of the vehicle and connected at its ends to the beams, and a releasable connection between the cross arm and the vehicle for holding the beams in operative positions with their front ends above the engine, said connection being releasable to move the front ends of the beams below the upper portion of the engine and permit access to the engine.

5. In a vehicle having an engine, a supporting beam pivotally mounted intermediate its ends on each side of the vehicle for movement about a generally horizontal axis, each beam having a part extending forwardly and upwardly to a point above the engine and also having a generally horizontal part extending rearwardly from its pivotal mounting, a working implement in front of the vehicle, adjustable means for supporting the implement on the beams, a cross arm at the rear of the vehicle and connected at its ends to the beams, and a releasable connection between the cross arm and the vehicle for holding the beams in operative positions with their front ends above the engine, said connection being releasable to move the front ends of the beams below the upper portion of the engine and permit access to the engine.

JOHN AUGUST RAU.